United States Patent
Larsen et al.

(10) Patent No.: US 8,894,944 B2
(45) Date of Patent: Nov. 25, 2014

(54) MEMBRANE WITH A STABLE NANOSIZED MICROSTRUCTURE AND METHOD FOR PRODUCING SAME

(75) Inventors: Peter Halvor Larsen, Roskilde (DK); Søren Linderoth, Roskilde (DK)

(73) Assignee: Technical University of Denmark, Kgs. Lyngby (DK)

( * ) Notice: Subject to any disclaimer, the term of this patent is extended or adjusted under 35 U.S.C. 154(b) by 1058 days.

(21) Appl. No.: 12/674,949

(22) PCT Filed: Aug. 29, 2008

(86) PCT No.: PCT/EP2008/007096
§ 371 (c)(1), (2), (4) Date: Apr. 1, 2011

(87) PCT Pub. No.: WO2009/027251
PCT Pub. Date: Mar. 5, 2009

(65) Prior Publication Data
US 2011/0176980 A1 Jul. 21, 2011

(30) Foreign Application Priority Data
Aug. 31, 2007 (EP) .................... 07017111

(51) Int. Cl.
B01J 35/00 (2006.01)
B01D 69/14 (2006.01)
(Continued)

(52) U.S. Cl.
CPC .......... *B01D 67/0046* (2013.01); *B01D 69/145* (2013.01); *B01D 2325/10* (2013.01);
(Continued)

(58) Field of Classification Search
CPC ......... A01N 59/00; A01N 37/16; B01J 19/00; B01J 8/00; B01J 2523/023; B01J 2523/54; B01J 2523/68; B01J 2523/842; B01J 2523/00; B01J 19/2485; B01J 19/249; B01J 35/0006; B01J 35/04; B01J 35/004; B01J 35/023; B82Y 30/00; B82Y 40/00; H01M 2008/1095; C08F 8/06; C08F 210/16; C08F 8/00; C01B 2203/0233; B01D 53/104; B01D 53/02; B01D 2253/104; B01D 2258/0283
USPC ..................... 422/129, 211, 222; 502/1, 2, 4; 423/210, 219
See application file for complete search history.

(56) References Cited

U.S. PATENT DOCUMENTS 5,306,411 A * 4/1994 Mazanec et al. .............. 204/265
5,569,633 A 10/1996 Carolan et al. .................... 502/4
(Continued)

FOREIGN PATENT DOCUMENTS

CN 1864830 A * 11/2006
WO WO 2007/086949 A2 * 8/2007

OTHER PUBLICATIONS

Machine translation of CN 1864830 A, which was published Nov. 22, 2006.*
(Continued)

*Primary Examiner* — Natasha Young
(74) *Attorney, Agent, or Firm* — Seed IP Law Group PLLC

(57) ABSTRACT

The present invention provides a membrane, comprising in this order a first catalyst layer, an electronically and ionically conducting layer having a nanosized microstructure, and a second catalyst layer, characterized in that the electronically and ionically conducting layer is formed from an electrolyte material, a grain growth inhibitor and/or grain boundary modifier, and a method for producing same.

13 Claims, 1 Drawing Sheet

(51) Int. Cl.

| | | |
|---|---|---|
| *B01J 23/889* | (2006.01) | |
| *B01J 23/83* | (2006.01) | |
| *B01D 67/00* | (2006.01) | |
| *B01D 71/02* | (2006.01) | |
| *B01D 53/86* | (2006.01) | |
| *B01D 69/10* | (2006.01) | |
| *B01J 37/02* | (2006.01) | |
| *B01D 53/22* | (2006.01) | |
| *B01J 23/00* | (2006.01) | |
| *C01B 13/02* | (2006.01) | |
| *B01J 35/06* | (2006.01) | |
| *B01J 23/86* | (2006.01) | |
| *B01J 35/02* | (2006.01) | |
| *C08F 8/00* | (2006.01) | |
| *C08F 8/06* | (2006.01) | |
| *B01D 53/00* | (2006.01) | |

(52) U.S. Cl.
CPC .......... *B01J 23/8892* (2013.01); *B01J 35/0033* (2013.01); *B01J 23/83* (2013.01); *B01D 2313/42* (2013.01); *B01D 71/024* (2013.01); *B01D 53/8668* (2013.01); *B01D 69/10* (2013.01); *B01J 37/0244* (2013.01); *B01J 35/023* (2013.01); *B01D 53/228* (2013.01); *B01D 2257/7022* (2013.01); *B01J 23/002* (2013.01); *B01J 37/0219* (2013.01); *C01B 13/0255* (2013.01); *B01J 35/065* (2013.01); *B01J 23/86* (2013.01); *B01J 2523/00* (2013.01)
USPC .......... 422/222; 422/211; 423/210; 423/219; 502/1; 502/2; 502/4

(56) References Cited

U.S. PATENT DOCUMENTS

| | | | |
|---|---|---|---|
| 6,165,553 | A | 12/2000 | Chen et al. .................. 427/240 |
| 2006/0131182 | A1* | 6/2006 | Mazanec et al. ............. 205/551 |
| 2006/0175256 | A1 | 8/2006 | Masten et al. ................ 210/638 |
| 2007/0248503 | A1* | 10/2007 | Boersma et al. ............. 422/129 |
| 2010/0062317 | A1* | 3/2010 | Selcuk ........................... 429/34 |

OTHER PUBLICATIONS

Wang et al., Nonstoichiometry of Ce0.9Gd0.1O1.95-x, 1998, Solid State Ionics 107, pp. 73-79.*

* cited by examiner

MEMBRANE WITH A STABLE NANOSIZED MICROSTRUCTURE AND METHOD FOR PRODUCING SAME

FIELD OF THE INVENTION

The present invention provides a stable membrane having a nanosized microstructure, and a method for producing same. The membrane is especially suitable as a gas separation membrane.

BACKGROUND ART

Generally, separation membranes are made from various inorganic or organic materials, including ceramics, metals and polymers. For example, ceramic structures are oxygen ion conductors and are suitable to cause selective permeation of oxygen ions at high temperatures, such as temperatures of about 500° C. or more. Membranes comprising at least a layer of said ceramic materials are therefore suitable to separate oxygen from oxygen containing gas mixtures.

More specifically, it has been suggested to apply catalyst layers to both sides of a ceramic membrane structure and to connect said catalyst layers externally. On one side of the membrane, the oxygen partial pressure is adjusted to be lower than on the other side of the membrane. In said configuration, oxygen atoms at the side with the higher oxygen partial pressure accept electrons and become oxygen ions, which diffuse through the membrane to the opposite catalyst layer, where they discharge and become oxygen atoms again. The electrons are transferred back via the external circuit to the first catalyst layer. As a result, oxygen is continuously separated from the gas at the side of the membrane which has the higher oxygen partial pressure.

The above-described membranes are also suitable for partial oxidation processes, for instance oxidation of methane gas in order to produce syngas, i.e. a mixture of CO and $H_2$. Syngas is an important intermediate product in the production of methanol, ammonia, or synthetic diesel.

Some oxygen ion conductors also exhibit electron conductivity, referred to as electron-oxygen ion mixed conductors, or just mixed conductors. Alternatively, dual conducting mixtures may be prepared by mixing an ion-conducting material with an electronically conducting material to form a composite, multi-component, non-single phase material.

The following Table lists some of the proposed materials for oxygen separation together with some of their properties.

TABLE 1

Properties of membrane candidate materials.

| | $\sigma_O$(S/m), 1073K | $\sigma_O$ (S/m), 1273K) | $p_{O_2}$(atm) |
|---|---|---|---|
| $La_{0.6}Sr_{0.4}FeO_{3-\delta}$ | 1 [1] | 20 [1] | $10^{-17}$ (1273K) $10^{-14}$ (1473K) [2] |
| $La_{0.6}Sr_{0.4}Co_{0.2}Fe_{0.8}O_{3-\delta}$ | 4 [3] | 20 [3] | $10^{-7}$ (1273K) [2] |
| $La_{0.6}Sr_{0.4}CoO_{3-\delta}$ | 6 [4] | 40 [4] | $10^{-7}$ (1273K) [2] |
| $Ba_{0.5}Sr_{0.5}FeO_{3-\delta}$ | >4 [5] | >8 [5] | $10^{-7}$ (1273K) [2] |
| $Ba_{0.5}Sr_{0.5}Co_{0.8}Fe_{0.2}O_{3-\delta}$ | >27 [5] | >47 [5] | $10^{-7}$ (1273K) [2] |
| $Ce_{0.9}Gd_{0.1}O_{1.95-\delta}$ | 6 [6] | 16 [6] | — |
| $Ce_{0.8}Gd_{0.2}O_{1.9-\delta}$ | 6 [6], 20 [7] | 16 [6], 25 [7] | — |
| $Y_{0.16}Zr_{0.84}O_{1.92}$ | | 10 | — |

References in Table 1:
[1] M. Søgaard, P. V. Hendriksen, M. Mogensen, "Oxygen nonstoichiometry and transport properties of strontium substituted lanthanum ferrite", J. Solid State Chem 180 (2007) 1489-1503.
[2] T. Nakamura, G. Petzow, L. J. Gauckler, "Stability of the perovskite phase $LaBO_3$ (B = V, Cr, Mn, Fe, Co, Ni) in a reducing atmosphere i. experimental results", Materials Research Bulletin 14 (1979) 649-659.
[3] B. Dalslet, M. Søgaard, P. V. Hendriksen, "Determination of oxygen transport properties from flux and driving force measurements using an oxygen pump and an electrolyte probe", J. Electrochem. Soc., to be published.
[4] M. Søgaard, P. V. Hendriksen, M. Mogensen, F. W. Poulsen, E. Skou, "Oxygen nonstoichiometry and transport properties of strontium substituted lanthanum cobaltite", Solid State Ionics 177 (2006) 3285-3296.
[5] Z. Chen, R. Ran, W. Zhou, Z. Shao, S. Liu, "Assessment of $Ba_{0.5}Sr_{0.5}Co_{1-y}Fe_yO_{3-\delta}$ (y = 0.0-1.0) for prospective application as cathode for it-SOFCs or oxygen permeating membrane", Electrochimica Acta 52 (2007) 7343-7351.
[6] S. Wanga, H. Inaba, H. Tagawa, M. Dokiya, T. Hashimoto, "Nonstoichiometry of $Ce_{0.9}Gd_{0.1}O_{1.95-x}$", Solid State Ionics 107 (1998) 73-79.
[7] N. Sammes, Z. Cai, "Ionic conductivity of ceria/yttria stabilized zirconia electrolyte materials", Solid State Ionics 100 (1997) 39-44.

Especially flourite and perovskite structured metal oxide materials offer a number of candidates for good oxygen separation membranes. Table 1 lists the oxygen ion conductivity, $\sigma_o$ of these materials as well as the $pO_2$ of decomposition at various temperatures (The $pO_2$ of decomposition is estimated as the $pO_2$ of decomposition of $LaCoO_3$ for the Co containing perovskites, and the $pO_2$ of decomposition of $LaFeO_3$ for the Fe containing perovskites). The other listed materials in Table 1 are stable in the $pO_2$ range required for syngas production.

As is evident from the Table, the Co-containing perovskites exhibit a high ionic conductivity. However, they do not posses sufficient thermodynamic stability for operating at low $pO_2$, as is required for instance for production of synthesis gas in a membrane reactor.

On the other hand, of the materials possessing sufficient thermodynamic stability as required for syngas production, doped Ceria possesses the highest ionic conductivity as compared to the above perovskite candidates.

The performance of a mixed conducting membrane will in general be limited by either the electronic or the ionic conductivity, whichever is lower. For the perovskite materials, the ionic conductivity is generally the limiting factor, whereas the electronic conductivity is the limiting factor for the fluorite materials. At high $pO_2$ the performance of $Ce_{0.9}Gd_{0.1}O_{1.95-\delta}$ and $Ce_{0.8}Gd_{0.2}O_{1.9-\delta}$ will be limited by their electronic conductivity. It has been suggested to enhance the electronic conductivity by using Pr substitution rather than Gd substitution. However, in order to improve the performance of the membrane, for example for the syngas production, new materials are desired exhibiting a better balance of ionic and electronic conductivity to overcome the current limits as provided by the prior art.

Additionally, membranes can be used to separate hydrogen. Hydrogen can serve as a clean fuel for powering many devices ranging from large turbine engines in integrated gasification combined cycle electric power plants, to small fuel cells. Hydrogen can also power automobiles, and large quantities are used in petroleum refining.

In operation, the above described ceramic membranes are exposed to extreme conditions. The opposite sides of the membrane are simultaneously exposed to a highly oxidizing and a highly reducing atmosphere, respectively, at high temperatures. Also the thermal expansion of the membrane at high temperatures might result in stress to the other parts of the apparatus containing said membrane. The membranes therefore need chemical stability with respect to decomposition and should further exhibit low expansion properties.

U.S. Pat. No. 6,139,810 discloses a reactor comprising reaction tubes which comprise an oxygen selective ion transport membrane with an oxidation catalyst side, wherein said membrane is formed from a mixed conductor metal oxide, a heat transfer means formed from metal, and a reforming catalyst disposed about said oxidation catalyst side of said oxygen selective ion transport membrane.

WO-A1-01/09968 relates to mechanically strong, highly electronically conductive porous substrates for solid-state electrochemical devices. A gas separation device is disclosed comprising a first catalyst layer comprising a metal and a second catalyst layer comprising a ceramic material.

U.S. Pat. No. 6,033,632 relates to solid state gas-impermeable, ceramic membranes useful for promotion of oxidation-reduction reactions as well as for oxygen gas separation. The membranes are fabricated from a single-component material which exhibits both, electron conductivity and oxygen-ion conductivity. Said material has a brownmillerite structure with the general formula $A_2B_2O_5$.

EP-A-0 766 330 discloses a solid multi-component membrane which comprises intimate, gas-impervious, multi-phase mixtures of an electronically-conductive phase and/or gas-impervious "single phase" mixed metal oxides having a perovskite structure and having both electron-conductive and oxygen ion-conductive properties.

U.S. Pat. No. 5,569,633 discloses an ion transport membrane comprising a dense mixed conducting multicomponent metallic oxide layer having a first surface contiguous to a porous layer and a second surface which is coated with a catalyst, wherein the dense mixed conducting multicomponent metallic oxide layer and the porous layer are independently formed from one or a mixture of multicomponent metallic oxides.

U.S. Pat. No. 6,165,553 discloses a method of fabricating a ceramic membrane comprising:
providing a colloidal suspension of a ceramic powder;
providing a polymeric precursor comprising a polymer containing metal cations;
mixing the polymeric precursor together with the colloidal suspension;
applying the mixture to a membrane support to form a composite structure; and
heating the composite structure to form a dense membrane on the membrane support.

US 2006/0175256 A1 relates to a composite material for purification and filtration of water containing ozone and organic matter which comprises:
(a) a microporous to mesoporous inert ceramic filter, and
(b) a multi-layered, nanocrystalline, sintered ceramic metal oxide catalyst membrane coating on surfaces of the ceramic filter, wherein the catalyst in use degrades the ozone in the water into a hydroxyl or other radical in situ which reacts with the organic matter by the composite ceramic membrane during filtration.

However, the membranes proposed in the prior art do not result in membranes having a good balance of ionic and electronic conductivity, limiting the membrane efficiency due to the inherent limit of either the electrical or ionic conductivity of the employed materials. On the other hand, the suggested materials showing a promising balance are chemically unstable structures not being suitable for membrane mass production, as the membranes have a very short life time. There is thus still a need for membrane structures which are cheap, provide a good balance of a mixed ionic and electronic conductivity while exhibiting a chemical stability under the relevant oxygen partial pressures.

OBJECT OF THE INVENTION

In view of the problems associated with the membranes of the prior art, it was the object of the present invention to provide a membrane having a stabilized nanostructure and improved electronic conductivity, and a method for producing same.

SUMMARY OF THE INVENTION

The above object is achieved by a membrane, comprising in this order a first catalyst layer, an electronically and ionically conducting layer having a nanosize microstructure, and a second catalyst layer, characterized in that the electronically and ionically conducting layer is formed from an electrolyte material, a grain growth inhibitor and/or grain boundary modifier.

The above object is further achieved by a method of producing the above membrane, comprising the steps of:
providing a first catalyst or catalyst precursor layer,
applying an electronically and ionically conducting layer on the first catalyst or catalyst precursor layer;
applying a second catalyst or catalyst precursor layer on the electronically and ionically conducting layer; and
sintering the multilayer structure.

Preferred embodiments are set forth in the subclaims and the detailed description of the invention below.

DETAILED DESCRIPTION OF THE INVENTION

The present invention provides a membrane, comprising in this order a first catalyst layer, an electronically and ionically conducting layer having a nanosize microstructure, and a second catalyst layer,
characterized in that the electronically and ionically conducting layer is formed from an electrolyte material, a grain growth inhibitor and/or grain boundary modifier.

Advantageously, the membrane of the present invention exhibits stability of the obtained nanostructure while having an excellent balance of ion and electron conductivity. The electronically and ionically conducting layer is formed from an electrolyte material together with a grain growth inhibitor and/or grain boundary modifier, which results in the obtained membrane structure being formed by nanosized particles. Further grain growth into particles in the micrometer range is minimized. The crystallite structure preferably exhibits an average grain size of the particles in the range of up to 400 nm, more preferably of up to 300 nm, even more preferred of up to 200 nm. Particularly preferred are structures having a nanosize microstructure in the range of 100 nm or below. The crystallinity can be fine tuned by addition of the grain growth inhibitor, depending on the desired application.

Figure 4:
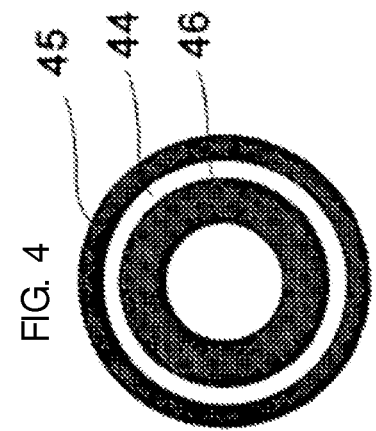
FIG. 4 illustrates another membrane structure in accordance with the present invention, the membrane having a tubular design.
Figure 1:
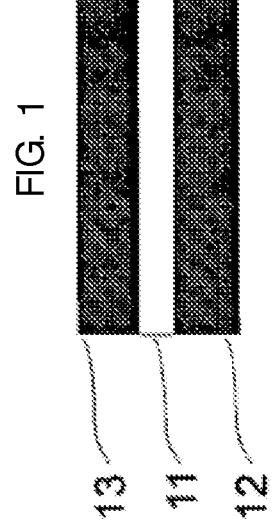
FIG. 1 illustrates a membrane structure in accordance with the present invention.

In FIG. 1, the principle structure of the membrane of the present invention is illustrated. The electronically and ionically conducting layer 11 is sandwiched between the first catalyst layer 12 and the second catalyst layer 13. The membrane of FIG. 1 is shown as a symmetrical flat plate design. In FIG. 4, a tubular design as an alternative is illustrated, with the electronically and ionically conducting layer 44 being sandwiched between the first catalyst layer 45 and the second catalyst layer 46. The membrane may of course have other designs than a flat plate or tubular design, depending on the desired application. Additional layers may also be present, such as a support layer for the first and/or second catalyst layer, and/or (a) bonding layer(s), as will be outlined below.

Preferably, the material forming the later first and/or second catalyst layer comprises a metal. More preferred is the first and/or second catalyst layer being formed from a metal being selected from the group consisting of $Fe_{1-x-y}Cr_xM_y$ with M being Ni, Ti, Ce, Mn, Mo, W, Co, La, Y or Al, and Ni-based alloys. In the formula, x is $0 \leq x \leq 1$, preferably from 0.1 to 0.9, and more preferably of from 0.2 to 0.8. Y is $0 \leq y \leq 0.3$, preferably from 0 to 0.1, and more preferably of from 0 to 0.05. Also preferred is y being at least 0.01. Other metals and metal alloys may be employed as well. The first and/or second catalyst layer may also comprise metal oxides such as $Al_2O_3$, $TiO_2$ or $Cr_2O_3$, and doped ceria or doped zirconia. Suitable dopants are Sc, Y Ce, Ga, Sm, Gd, Ca and/or any Ln element, or combinations thereof. Preferred dopants for zirconia are Sc or Y. A preferred dopant for ceria is Gd. Ln=lanthanides.

However, the catalyst layer may of course be formed from other materials than metals.

In case the catalyst layer is intended to form the later oxygen reducing catalyst, preferred materials for forming said catalyst layer comprise one or more materials selected from the group of $(Ma_{1-x}Mb_x)(Mc_{1-y}Md_y)O_{3-\delta}$, doped ceria or doped zirconia, or mixtures thereof. Ma=lanthanides or Y, preferably La. Mb=earth alkali elements, preferably Sr. Mc and Md are one or more elements chosen from the group of transition metals, preferably one or more of the type Mn, Fe, Co. In the formula, x is $0 \leq x \leq 1$, preferably from 0.1 to 0.9, and more preferably of from 0.2 to 0.8. Y is $0 \leq x \leq 1$, preferably from 0.1 to 0.9, and more preferably of from 0.2 to 0.8. $\delta$ is the oxygen nonstoichiometry parameter and relates to the variation in the oxygen stoichiometry of the oxide, as obtained depending on conditions such as the oxygen partial pressure, temperature and the like during the manufacture of the oxide, as is well known to a person skilled in the art.

In case the catalyst layer is intended to form the later oxidation catalyst layer, more preferred materials for forming said catalyst layer comprise a material selected from the group of Ni, Ni—Fe alloy, Ru, Pt, doped ceria, or doped zirconia, or mixtures thereof. The dopants are the same as mentioned earlier. Alternatively $Ma_sTi_{1-x}Mb_xO_{3-\delta}$, Ma=Ba, Sr, Ca; Mb=V, Nb, Ta, Mo, W, Th, U; $0 \leq s \leq 0.5$; $0 \leq x \leq 1$; or $LnCr_{1-x}M_xO_{3-\delta}$, M=Ti, V, Mn, Nb, Mo, W, Th, U, $0 \leq x \leq 1$, may be used as oxidation catalyst materials.

The oxidation catalyst material in the sense of the present invention may preferably be a material for oxidizing oxide ions to oxygen, carbon to carbon monoxide, or, alternatively, a mixture of methane and water to a mixture of carbon monoxide and hydrogen (syngas).

The reduction catalyst material in the sense of the present invention is a material reducing oxygen to oxide ions.

The electronically and ionically conducting layer preferably comprises $Ce_{1-x}M_xO_{2-\delta}$ with M being selected from the group of Ca, Sm, Gd, Sc, Ga and Y. More preferred is $Ce_{1-x}Gd_xO_{2-\delta}$ (CGOX), with x being $0 \leq x \leq 1$, preferably from 0.1 to 0.9, and more preferably of from 0.2 to 0.8. $\delta$ is the oxygen nonstoichiometry parameter. The doped ceria is advantageously an oxygen conducting material. The electronically and ionically conducting layer of the present invention further has a crystallinity in the nanosize range, as indicated above.

To provide better electronic conductivity, the electronically and ionically conducting layer is preferably mixed with small amounts of an electronically conducting material.

The electronically and ionically conducting layer comprises a grain growth inhibitor. Said grain growth inhibitors act in one of two ways: I) they advantageously form separate grains in the material which are less soluble in the bulk and the grain boundary phase and thus prevent the grains from growing too large, thereby ensuring more three phase boundaries. II) Alternatively, the grain growth inhibitor form a grain boundary phase that promotes the sintering (pore elimination) without excessive grain growth. Preferably, the grain growth inhibitor comprises an oxide selected from the group of $Al_2O_3$, $TiO_x$, $Cr_2O_3$, $Sc_2O_3$, $VO_x$, $TaO_x$, $MnO_x$, $NbO_x$, SrO, CaO, MgO, $Bi_2O_3$, $LnO_x$, $MgCr_2O_4$, $MgTiO_3$, $CaAl_2O_4$, $LaAlO_3$, $YbCrO_3$, $ErCrO_4$, $NiTiO_3$, $NiCr_2O_4$, metal carbides, metal nitrides, and mixtures thereof.

The electronically and ionically conducting layer further comprises a grain boundary modifier which enhances the grain boundary conductivity. Preferably, the grain boundary modifier comprises an oxide selected from the group of $CoO_x$, $MnO_x$, $TiO_x$, $VO_x$, $Cr_2O_3$, $MgCr_2O_4$, $CaCr_xV_yO_4$, $SrCr_xV_yO_4$, $YbCrO_3$, $ErCrO_4$, $NiTiO_3$, and $NiCr_2O_4$, and mixtures thereof.

Figure 2:
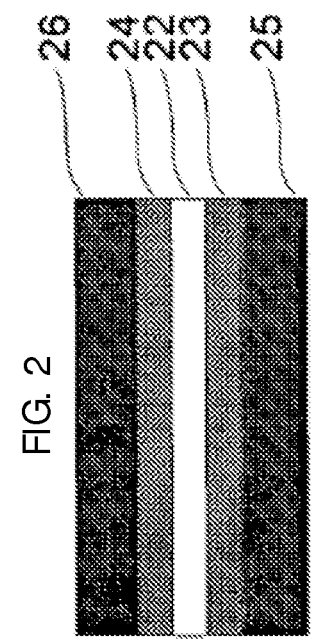
FIG. 2 illustrates another membrane structure in accordance with the present invention, comprising catalyst support layers.
Figure 3:
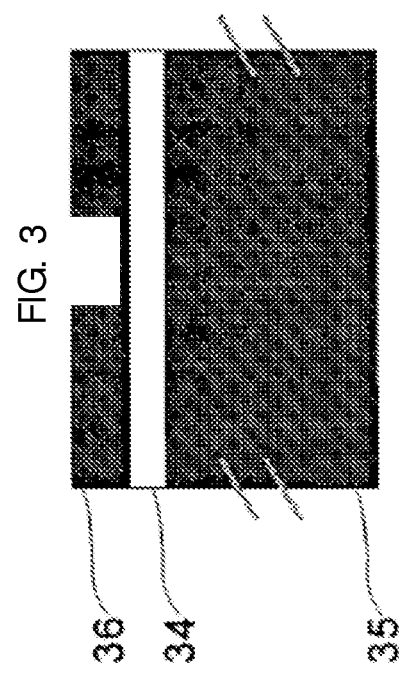
FIG. 3 illustrates another membrane structure in accordance with the present invention, comprising a combined support and catalyst layer.

In another preferred embodiment, the first and/or second catalyst layers are supported by a support layer. In FIG. 2, the membrane comprises two support layers 25 and 26 supporting each catalyst layer. In a further preferred embodiment, the first and/or second catalyst layer may be combined with a support layer to form one layer, as illustrated in FIG. 3. Layer 35 is a combined first catalyst layer and support layer, depictured in this specific instance by the increased thickness. The support layer(s) provide increased mechanical stability.

Preferably, the support layer(s) are a metallic support layer. Metallic support layers can be obtained from cheap starting materials which, at the same time, provide excellent mechanical stability as compared to brittle ceramic supports. The metallic support layer also has an excellent heat conductivity that will even temperature gradients in the membrane. Further to that the metallic support layer can be combined to serve as a catalyst layer. Consequently, the process can be simplified which results in the membrane being more cost effective. However, the support may of course be formed from other materials than metals.

In a further preferred embodiment, an additional bonding layer may be applied between the electronically and ionically conducting layer and one or each of the adjacent layers. The bonding layers comprise ionically conductive and electronically conductive material, preferably the materials used for the respective layers adjacent to the bonding layers, so as to provide an improved adhesion of the layers. As the TEC of the bonding layers is larger than the TEC of the electronically and ionically conducting layer, but smaller than the TEC of the electronically conducting layers, the mechanical strength of the whole structure is improved while providing better adhesion of the respective layers. If a bonding layer is present, said bonding layer will be functioning as the catalyst layer as it is located next to the electronically and ionically conducting layer. The bonding layer thus comprises catalytic material.

The present invention also provides a method of producing the above membrane, comprising the steps of:
  providing a first catalyst or catalyst precursor layer,
  applying an electronically and ionically conducting layer on the first catalyst or catalyst precursor layer;
  applying a second catalyst or catalyst precursor layer on the electronically and ionically conducting layer; and
  sintering the multilayer structure.

Since cheap materials can be employed, and since the method is simple and does not require much labour, a cost effective production of the membrane structure can be ensured, enabling mass production of an inexpensive high performance component for industrial processes.

The material for the electronically and ionically conducting layer may be a powder, and the grain growth inhibitor material and/or grain boundary conductivity enhancing material may be added before or during the manufacturing process. The grain growth inhibitor and/or grain boundary modifier are preferably deposited on the surface of the nano particulate material for the electronically and ionically conducting layer. This may for instance be achieved using nitrated solutions of the elements, "templating" (cations or charged particles attached to polymers) or by hetero coagulation.

Preferably, the method further comprises the step of applying a catalyst material or catalyst precursor material into the catalyst precursor layer. Depending on the material of which the layer is formed, the additional catalyst material provides a better performance. Said catalyst material may preferably be impregnated as a catalyst material or catalyst precursor material during the manufacture. Alternatively, the catalyst material or catalyst precursor material may be introduced into the membrane structure prior to sintering if impregnation is not employed. In case a catalyst precursor material is used, said precursor is converted into the final catalyst material after sintering. Preferred for impregnation are solutions of the respective catalyst nitrate salts, and suspensions.

The layers may be, for example, formed by tape casting. If a tubular design is desired, extrusion processes may be employed, as is known to a person skilled in the art. The additional layers may be separately tape cast, followed by lamination of the layers. Alternatively, screen printing, spray painting or dip coating methods may be used for the formation of the respective layers.

In a preferred embodiment, the method further comprises the step of providing a support layer for the first and/or second catalyst layer. The first catalyst precursor layer is then applied to the support layer, followed by application of the electronically and ionically conducting layer. If the first catalyst layer is also a combined support layer, as illustrated in FIG. 3, the layer preferably is a layer having a thickness of from about 200 to 2000 μm to provide the desired mechanical stability.

The catalyst precursor layer, and, if desired, the support layer, are preferably impregnated, more preferably vacuum impregnated with a solution or suspension of the catalyst or catalyst precursor. Since the catalyst layer or support layer are porous layers, alternatively electrophoretic deposition (EPD) may be employed to apply the catalyst material or catalyst precursor material.

In another preferred embodiment, the catalyst material or catalyst precursor material may be applied on the surface of the support layer, for example by spray painting the catalyst material thereon. Depending on the application, the catalytic activity may be sufficient even if the catalyst material is only provided on the surface of the support layer.

Preferably, the sintering step is carried out at temperatures of about 900 to 1500° C., preferably from about 1000 to 1300° C., and more preferably of from about 1100 to 1200° C. Said step is preferably carried out under reducing conditions. Prior to the sintering at said temperatures, any organic material is removed, for example burned or decomposed, at temperatures in the range of from 300 to 700° C. Said removal is usually carried out under oxidizing conditions.

In the method of the present invention, the grain growth inhibitor improves the conductivity of the grain boundary while ensuring a stable nanosize structure. Advantageously, the additives also act as a sintering aid during the manufacturing process when the membrane structure is initially sintered. After the binder and organic material removal, the atmosphere is changed to a reducing atmosphere and the sintering process is continued at a higher temperature. Under these conditions the solubility of the grain growth inhibitor in the grains is very small and the inhibitor therefore is expelled to grain boundaries and interfaces. Being placed at grain boundaries and interfaces, the particles act to prevent further grain growth.

In effect, the grain growth inhibitor can advantageously act as sintering aid, followed by grain inhibitor, followed by a possible enhancement of the electronic conductivity of the membrane. Thus, the membrane of the present invention can omit additional additives such as sintering aids and conductivity enhancers, thereby simplifying the process and reducing the material costs.

All preferred embodiments and materials described above for the membrane of course also apply to the method of the present invention.

The membrane of the present invention is especially suitable for oxygen separation.

The present invention will now be described in more detail with reference to the following examples. The invention is however not intended to be limited thereto.

EXAMPLES

Example 1

A symmetric flat plate membrane was obtained with impregnated catalyst layers. The configuration is illustrated in FIG. 1.

The first step comprised the tape-casting of a first and second catalyst layer and a membrane layer.

Suspensions for tape-casting were manufactured by means of ball milling of powders with polyvinyl pyrrolidone (PVP), polyvinyl butyral (PVB) and EtOH+MEK as additives. After control of particle size, the suspensions were tape-cast using a double doctor blade system and the tapes were subsequently dried.

Catalyst precursor layer (layers 12 and 13): The suspension comprised Fe22Cr. The green thickness was in the range of 50 to 70 μm. The sintered porosity of the layer was about 50% with a pore size in the range of 1 to 2 μm.

Membrane layer (layer 11): The suspension comprised $Ce_{0.9}Gd_{0.1}O_{2-\delta}$ (CGO10) powder and 1 vol % $Cr_2O_3$. The green thickness of the foil was around 25 μm. The sintered density of the layer was >96% of theoretical density.

The second step comprised the lamination of the above-mentioned foils into a symmetrical structure: catalyst precursor layer (12)—membrane layer (11)—catalyst precursor layer (13), as shown in FIG. 1. The lamination was performed by the use of heated rolls in a double roll set-up.

In the third step, the laminated tapes were cut into square pieces. This was done by knife punching resulting in sintered areas in the range of 12×12 cm².

In the fourth step, the cell was heated at an increase of about 50° C./h to about 500° C. under flowing air. After 2 hours of soaking, the furnace was evacuated and $H_2$ introduced. After 3 hours soaking time, the furnace was heated to about 1200° C. with a temperature increase of 100° C./h and left for 5 hours before cooling to room temperature.

The fifth step was the impregnation of the catalyst precursor layer into the final oxygen reduction catalyst layer 12. A nitrate solution of La, Sr, Co and Fe was vacuum infiltrated into the porous structure. The infiltration was performed four times with an intermediate heating step for decomposition of the nitrates. The resulting composition of the impregnated oxygen reduction catalyst was $La_{0.6}Sr_{0.4}Fe_{0.6}Co_{0.4}O_3$.

In the sixth step the second catalyst precursor layer was impregnated into the final oxidation catalyst layer 13. A nitrate solution of Ni, Ce and Gd was vacuum infiltrated into the porous structure. The infiltration was performed five times with an intermediate heating schedule between each infiltration for decomposition of the impregnated nitrates. The resulting composition of the impregnated oxidation catalyst part after reduction was a 1:1 vol ratio of Ni and $Ce_{0.9}Gd_{0.1}O_{2-\delta}$.

The obtained membrane was ready to be built in the desired application.

Example 2

A membrane was obtained as outlined for Example 1, but with an intermediate layer comprising metal and some ceria to ensure a better bonding between the membrane and metal layers. The configuration is illustrated in FIG. 2.

The first step comprised tape-casting of metal containing layers (25 and 26), intermediate layers (23 and 24) and a membrane layer (22).

Suspensions for tape-casting were manufactured and cast as described in Example 1.

Metal support layers (25 and 26): The suspension comprised Fe22Cr. The green thickness was in the range of 50 to 70 μm. The sintered porosity of the layer was about 50% with a pore size in the range of 3 to 4 μm.

Intermediate catalyst precursor layers (23 and 24): The suspension comprised 90 vol % Fe22Cr and 10 vol % CGO10. The green thickness was in the range of 25 μm. The sintered porosity of the layer was about 50% with a pore size in the range of 1 to 2 μm.

Membrane layer (22): The suspension comprised CGO10 and $TiO_2$. The green thickness of the foil was around 25 μm. The sintered density of the layer was >96% of theoretical density.

The second step comprised the lamination of the above-mentioned foils into symmetrical structure: metal layer (26)—intermediate layer (24)—membrane layer (22)—intermediate layer (23)—metal layer (25). The lamination was performed by the use of heated rolls in a double roll set-up.

In the third step, the laminated tapes ware cut into square pieces. This was done by knife punching resulting in sintered areas in the range of 12×12 cm².

In the fourth step, the membrane was heated at an increase of about 50° C./h to about 500° C. under flowing air. After 2 hours of soaking, the furnace was evacuated and $H_2$ was introduced. After 3 hours soaking time, the furnace was heated to about 1200° C. with a temperature increase of 100° C./h and left for 5 hours before cooling to room temperature.

The fifth step was the impregnation of the first catalyst precursor layer to form the oxygen reduction catalyst layer. A nitrate solution of La, Sr, Co and Fe was vacuum infiltrated into the porous structure. The infiltration was performed four times with an intermediate heating step for decomposition of the nitrates. The resulting composition of the impregnated oxygen reduction catalyst was $La_{0.6}Sr_{0.4}Fe_{0.6}Co_{0.4}O_3$.

In the sixth step the second catalyst precursor layer was impregnated into the oxidation catalyst layer. A nitrate solution of Ni, Ce and Gd was vacuum infiltrated into the porous structure. The infiltration was performed five times with an intermediate heating schedule between each infiltration for decomposition of the impregnated nitrates. The resulting composition of the impregnated oxidation catalyst part after reduction was a 1:1 vol ratio of Ni and $Ce_{0.8}Gd_{0.2}O_{2-\delta}$ (CGO20).

Example 3

A membrane was obtained as outlined above for Example 1, but with thick support layer, i.e. an asymmetric membrane structure. The configuration is illustrated in FIG. 3.

The first step comprised the tape-casting of two different metal containing layers (~40 μm and 400 μm, respectively) and a membrane layer.

Suspensions for tape-casting were manufactured and cast as described in Example 1.

Metal support and catalyst precursor layer (layer 35): The suspension comprised 95 vol % Fe22Cr and 5 vol CGO10. The green thickness was in the range of 400 μm. The sintered porosity of the layer was about 50% with a pore size in the range of 4 μm.

Catalyst precursor layer (layer 36): The suspension comprised 95 vol % Fe22Cr and 5 vol CGO10. The green thickness was in the range of 40 μm. The sintered porosity of the layer was about 40% with a pore size in the range of 3 μm.

Layer 3 (membrane layer—layer 34): The suspension comprised CGO10 and 0.5 vol % $TiO_2$ and 0.5 vol % $Cr_2O_3$. The green thickness of the foil was around 25 μm. The sintered density of the layer was >96% of theoretical density.

The second step comprised the lamination of the above-mentioned foils into symmetrical structure: metal support layer (35)—membrane layer (34)—catalyst precursor layer (36), as shown in FIG. 3. The lamination was performed by the use of heated rolls in a double roll set-up.

In the third step, the laminated tapes were cut into square pieces. This was done by knife punching resulting in sintered areas in the range of 12×12 cm$^2$.

In the fourth step, the cell was heated at an increase of about 50° C./h to about 500° C. under flowing air. After 2 hours of soaking, the furnace was evacuated and H$_2$ introduced. After 3 hours soaking time, the furnace was heated to about 1200° C. with a temperature increase of 100° C./h and left for 5 hours before cooling to room temperature.

The fifth step was the impregnation of the oxygen reduction catalyst in to layer 36. A colloidal suspension of La$_{0.6}$Sr$_{0.4}$CoO$_3$ (LSC40) and CGO20 (2:1 vol. ratio) was vacuum infiltrated into the porous structure. The infiltration was performed four times with an intermediate heating step for removing the solvent.

In the sixth step the oxidation catalyst was impregnated in to layer 35. A colloidal suspension of Ni and CGO10 was vacuum infiltrated into the porous structure (vol. ratio 1:1). The infiltration was performed five times with an intermediate heating schedule between each infiltration for removing the solvent.

The membrane structure was completed as explained in Example 1.

Example 4

An asymmetric membrane structure with zirconia+metal, a Ce$_{0.9}$Y$_{0.1}$O$_{2-\delta}$ (CYO10) electrolyte, and metal support was obtained. The configuration is illustrated in FIG. 3.

The first step comprised tape-casting of a thick metal containing layer.

Suspensions for tape-casting were manufactured and cast as described in Example 1.

Metal support layer and catalyst precursor layer (layer 35): The suspension comprised 95 vol % Fe22Cr and 5 vol Zr$_{0.8}$Y$_{0.2}$O$_{2-\delta}$ (YSZ20). The green thickness was in the range of 500 μm. The sintered porosity of the layer was about 50% with a pore size in the range of 4 μm.

In the second step, the dry metal support tapes were cut into square pieces. This was done by knife punching resulting in sintered areas in the range of 12×12 cm$^2$.

The third step comprised the manufacture and screen printing of a catalyst precursor layer—layer 36 (comprising 95 vol % Fe22Cr and 5 vol % YSZ20) and a membrane ink with YGO (+2 vol % MgTiO$_3$+0.25 vol % MnO)—layer 34 on to the metal tape in the order: metal support and catalyst precursor layer (35)—membrane ink (34)—catalyst precursor ink (36)

In the fourth step, the cell was heated at an increase of about 50° C./h to about 500° C. under flowing air. After 2 hours of soaking, the furnace was evacuated and H$_2$ introduced. After 3 hours soaking time, the furnace was heated to about 1250° C. with a temperature increase of 100° C./h and left for 5 hours before cooling to room temperature.

The fifth step was the impregnation of the second catalyst layer into the oxygen reduction catalyst layer 36. A colloidal suspension of La$_{0.75}$Sr$_{0.25}$MnO$_3$ (LSM25) and YSZ20 (1:1 vol ratio) was vacuum infiltrated into the porous structure. The infiltration was performed four times with an intermediate heating step for removing the solvent.

In the sixth step the first catalyst precursor layer was impregnated to form oxidation catalyst layer 35. A colloidal suspension of Ni and YSZ20 was vacuum infiltrated into the porous structure (vol ratio 1:1). The infiltration was performed five times with an intermediate heating schedule between each infiltration for removing the solvent.

The finally obtained membrane structure was ready to be built into the desired application.

Example 5

A symmetrical flat plate membrane was obtained by impregnation of one of the catalyst layers. The configuration is illustrated in FIG. 1.

The first step comprised the tape-casting of a first catalyst precursor layer and a membrane layer.

Suspensions for tape-casting were manufactured by means of ball milling of powders with polyvinyl pyrrolidone (PVP), polyvinyl butyral (PVB) and EtOH+MEK as additives. After control of particle size, the suspensions were tape-cast using a double doctor blade system and the tapes were subsequently dried.

Catalyst precursor layer (layers 12): The suspension comprised Fe22Cr. The green thickness was in the range of 50 to 70 μm. The sintered porosity of the layer was about 50% with a pore size in the range of 1 to 2 μm.

Membrane layer (layer 11): The suspension comprised CGO10 powder and 1 vol % Cr$_2$O$_3$. The green thickness of the foil was around 25 μm. The sintered density of the layer was >96% of theoretical density.

The second step comprised the lamination of the above-mentioned foils into a symmetrical structure: catalyst precursor layer (12)—membrane layer (11). The lamination was performed by the use of heated rolls in a double roll set-up.

In the third step, the laminated tapes were cut into square pieces. This was done by knife punching resulting in sintered areas in the range of 12×12 cm$^2$.

In the fourth step, the cell was heated at an increase of about 50° C./h to about 500° C. under flowing air. After 2 hours of soaking, the furnace was evacuated and H$_2$ introduced. After 3 hours soaking time, the furnace was heated to about 1200° C. with a temperature increase of 100° C./h and left for 5 hours before cooling to room temperature.

In the fifth step the first catalyst precursor layer (layer 12) was impregnated to form the final oxidation catalyst layer 13. A nitrate solution of Ni, Ce and Gd was vacuum infiltrated into the porous structure. The infiltration was performed five times with an intermediate heating schedule between each infiltration for decomposition of the impregnated nitrates. The resulting composition of the impregnated oxidation catalyst part after reduction was a 1:1 vol ratio of Ni and CGO10.

In the sixth step a oxygen reduction catalyst layer (layer 13) comprising a 1:1 volume mixture of CGO10 and La$_{0.6}$Sr$_{0.4}$Fe$_{0.6}$Co$_{0.4}$O$_3$ was deposited on the membrane layer (11) opposite the catalyst precursor layer (layer 12) by screen printing. Ink for screen printing was made as described for suspensions in Example 1.

The obtained membrane was ready to be built in the desired application.

Example 6

A tubular metal supported membrane was obtained comprising a ceria membrane and outer metal layer deposited by spray painting. This configuration is illustrated in FIG. 4.

The first step comprised extrusion of a metal support and catalyst precursor tube based on a viscous mass of Fe22Cr powder—layer 46. The green wall thickness was about 600 μm and the sintered porosity of the layer was about 50% with a pore size in the range of 5 μm.

The second step comprised spray painting of a CGO10 suspension (+0.25 vol % Al$_2$O$_3$+0.5 vol % La$_{0.9}$Sr$_{0.1}$VO$_{3-67}$)—layer 44 on to layer 46. The suspension was manufactured as described for the suspensions in Example 1. The layer sintered to a density of more than 96% of the theoretical density.

The third step was spray painting of a catalyst precursor suspension (layer 45) on the membrane layer. The suspension that was manufactured as described for the suspensions in Example 1, comprised a mixture of 90 vol % FeCr and 10 vol % CGO10.

In the fourth step, the tube was heated at an increase of about 50° C./h to about 500° C. under flowing air. After 2 hours of soaking, the furnace was evacuated and $H_2$ introduced. After 3 hours soaking time, the furnace was heated to about 1200° C. with a temperature increase of 100° C./h and left for 5 hours before cooling to room temperature.

In the fifth step the catalyst precursor layer was impregnated on the inside of the tube to form the final oxidation catalyst layer 46. A colloidal suspension of NiO+CGO10 was vacuum infiltrated into the porous structure. The infiltration was performed six times with an intermediate heating schedule between each infiltration for removing the solvent.

In the sixth step the catalyst precursor layer was impregnated on the outside of the tube to form oxygen reduction catalyst layer 45. A colloidal suspension of $La_{0.6}Sr_{0.4}Fe_{0.6}Co_{0.4}O_3$ and CGO20 (1:1 vol) was vacuum infiltrated into the porous structure. The infiltration was performed five times with an intermediate heating schedule between each infiltration for removing the solvent.

Example 7

A thick metal supported tubular membrane was obtained, comprising a ceria membrane and an outer metal layer deposited by spray painting. Illustrated in FIG. 4.

The first step comprised the extrusion of a metal support tube based on a viscous mass of Fe22Cr powder. The green wall thickness was about 600 µm and the sintered porosity of the layer was about 50% with a pore size in the range of 5 µm.

The second step comprised the spray painting of an intermediate catalyst precursor layer on the outer surface of the tube. The suspension consisted of a mixture of 85 vol % Fe22Cr and 15 vol % CGO10. The suspension was manufactured as described for the suspensions in Example 1. The thickness was about 20 µm and the sintered porosity of the layer was about 35% with a pore size <2 µm.

The third step comprised the spray painting of a CGO suspension (+0.25 vol % $Al_2O_3$+0.5 vol % $La_{0.9}Sr_{0.1}VO_{3-\delta}$) on the intermediate catalyst precursor layer. The suspension was manufactured as described for the suspensions in Example 1. The layer sintered to a density of more than 96% of the theoretical density.

The fourth step was the spray painting of a catalyst precursor suspension on the membrane layer. The suspension that was manufactured as described for the suspensions in Example 1 comprised a mixture of 90 vol % Fe22Cr and 10 vol % CGO10.

In the fifth step, the cell was heated at an increase of about 50° C./h to about 500° C. under flowing air. After 2 hours of soaking, the furnace was evacuated and $H_2$ introduced. After 3 hours soaking time, the furnace was heated to about 1200° C. with a temperature increase of 100° C./h and left for 5 hours before cooling to room temperature.

In the sixth step the catalyst precursor layer was impregnated on the inside of the tube into the oxidation catalyst layer. A colloidal suspension of NiO+CGO10 was vacuum infiltrated into the porous structure. The infiltration was performed six times with an intermediate heating schedule between each infiltration for removing the solvent.

In the seventh step the catalyst precursor layer was impregnated on the outside of the tube into the oxygen reduction catalyst layer. A colloidal suspension of $La_{0.6}Sr_{0.4}Fe_{0.6}Co_{0.4}O_3$ and CGO10 (1:1 vol) was vacuum infiltrated into the porous structure. The infiltration was performed five times with an intermediate heating schedule between each infiltration for removing the solvent.

Example 8

A membrane structure as obtained in Example 7 was obtained, but with the catalysts impregnated to be an oxidation catalyst and oxygen reduction catalyst opposite to the ones of Example 7.

Example 7 was followed up to step five.

In the sixth step the catalyst precursor layer was impregnated on the outside of the tube to form the oxidation catalyst layer. A colloidal suspension of Ru was vacuum infiltrated into the porous structure. The infiltration was performed five times with an intermediate heating schedule between each infiltration for removing the solvent.

In the seventh step the catalyst precursor layer was impregnated on the inside of the tube to form the oxygen reduction catalyst layer. A colloidal suspension of LSC40 was vacuum infiltrated into the porous structure. The infiltration was performed six times with an intermediate heating schedule between each infiltration for removing the solvent.

Example 9

A membrane structure by dipcoating of the catalysts was obtained. The obtained structure is illustrated in FIG. 4.

The first step comprised extrusion of a metal support tube based on a viscous mass of Fe22Cr powder. The green wall thickness was about 600 µm and the sintered porosity of the layer was about 50% with a pore size in the range of 5 µm.

The second step comprised dip coating of an intermediate catalyst precursor layer on the outer surface of the tube. The suspension consisted of a mixture of 85 vol % Fe22Cr and 15 vol % CGO10. The suspension was manufactured as described for the suspensions in Example 1. The thickness was about 20 µm and the sintered porosity of the layer was about 35% with a pore size <2 µm.

The third step comprised dip coating of a CGO10 suspension and 0.5 vol % $Cr_2O_3$ on the intermediate layer. The suspension was manufactured as described for the suspensions in Example 1. The layer sintered to a density of more than 96% of the theoretical density.

The fourth step was dip coating of a catalyst precursor suspension on the membrane layer. The suspension that was manufactured as described for the suspensions in Example 1, comprises a mixture of 90 vol % Fe22Cr and 10 vol % CGO10.

In the fifth step, the membrane structure was heated at an increase of about 50° C./h to about 500° C. under flowing air. After 2 hours of soaking, the furnace was evacuated and $H_2$ introduced. After 3 hours soaking time, the furnace was heated to about 1200° C. with a temperature increase of 100° C./h and left for 5 hours before cooling to room temperature.

In the sixth step the catalyst precursor layer forming the later oxygen reduction catalyst was impregnated on the inside of the tube by electrophoretic deposition EPD. A suspension with positively charged particles of LSC30 was manufactured by employing polyethyleneimine. The infiltration was performed by applying a negative electrical field on the tube.

In the seventh step the catalyst precursor layer forming the later oxidation catalyst was impregnated on the outside of the tube. A colloidal suspension with negatively charged particles of NiO was made using ammonium polymethacrylate. The infiltration was performed by applying a positive electrical field on the tube.

Example 10

Manufacture of a thin membrane with a configuration as illustrated in FIG. 1.

The first step comprised the tape-casting of two layers (layer 12 and 13—catalyst precursor layers, and layer 11—membrane layer). Suspensions for tape-casting were manufactured by means of ball milling of powders with polyvinyl pyrrolidone (PVP), polyvinyl butyral (PVB) and EtOH+MEK as additives. After control of particle size, the suspensions were tape-cast using a double doctor blade set-up and the tapes were subsequently dried.

Catalyst precursor layer—layer 12 and 13: The suspension was based on CGO10 with Fe22Cr metal powder using charcoal as a pore-former. The green thickness was about 40 μm. The sintered porosity of the layer was about 50%.

Membrane layer—layer 11: The suspension was based on CGO10 powder and 2 vol % $Sc_2O_3$. The green thickness of the foil was about 12 μm. The sintered density of the layer was >96% of the theoretical density.

The second step comprised the lamination of the above mentioned foils into a layered structure comprising a membrane layer (11) sandwiched between two catalyst precursor layers (12, 13), as shown in FIG. 1. The lamination was performed by the use of heated rolls in a double roll set-up and takes place in one pass.

In the third step, the laminated tapes were cut into square pieces. This was done by knife punching resulting in sintered areas in the range of 12×12 to 30×30 $cm^2$.

The fourth step comprised the sintering of the obtained laminate. The laminate was heated at an increase of about 50° C./h to about 500° C. under flowing air. After 2 hours of soaking, the furnace was evacuated and $H_2$ introduced. After 3 hours soaking time, the furnace was heated to about 1200° C. with a temperature increase of 100° C./h and left for 5 hours before cooling to room temperature.

The fifth step was the impregnation of the catalyst precursor layer into oxygen reduction catalyst layer 12. The sintered cell was protected on one side for impregnation of the other side. A nitrate solution of La, Sr, Co and Fe was vacuum infiltrated into the porous structure. The infiltration was performed six times with an intermediate heating step for decomposition of the nitrates. The resulting composition of the impregnated perovskite oxygen reduction catalyst was: $(La_{0.6}Sr_{0.4})(Co_{0.2}Fe_{0.8})O_{3-67}$.

In the sixth step the catalyst precursor layer was impregnated into oxidation catalyst layer 13. The oxygen reduction catalyst impregnated side was protected. A nitrate solution of Ni, Ce and Gd was vacuum infiltrated into the porous structure. The infiltration was performed five times with an intermediate heating schedule between each infiltration for decomposition of the impregnated nitrates. The resulting composition of the impregnated oxidation catalyst part was 40 vol % Ni and 60 vol % $(Ce_{0.9}Gd_{0.1})O_{2-\delta}$ (after reduction of NiO).

The so formed cell was about 100 μm thick and ready to be built into a stack of cells. No heat treatment prior to stacking was required.

Example 11

Manufacture of a ceria high temperature oxygen separation membrane with a configuration as illustrated in FIG. 1.

The first step comprised tape-casting of two layers (layer 12 and 13—catalyst precursor layer, and layer 11—membrane layer). Suspensions for tape-casting were manufactured by means of ball milling of powders with polyvinyl pyrrolidone (PVP), polyvinyl butyral (PVB) and EtOH+MEK as additives. After control of particle size, the suspensions were tape-cast using a double doctor blade set-up and the tapes were subsequently dried.

Catalyst precursor layer—layer 12 and 13: The suspension comprised pre-calcined $(Ce_{0.9}Gd_{0.1})O_{2-\delta}$ and 10 vol % charcoal as a pore-former. The green thickness was about 40 μm. The sintered porosity of the layer was about 50%.

Membrane layer—layer 11: The suspension was based on $(Ce_{0.9}Gd_{0.1})O_{2-\delta}$ powder (0.5 vol % $Mn_3O_4$). The green thickness of the foil was about 12 μm. The sintered density of the layer was >96% of the theoretical density.

The second step comprised the lamination of the above mentioned foils into a layered structure comprising a membrane layer (11) sandwiched between two catalyst precursor layers (12 and 13), as shown in FIG. 1. The lamination was performed by the use of heated rolls in a double roll set-up and took place in one pass.

In the third step, the laminated tapes were cut into square pieces. This was done by knife punching resulting in sintered areas in the range of 12×12 to 30×30 $cm^2$.

The third step comprised the sintering of the laminate. The laminate was heated at an increase of about 50° C./h to about 500° C. under flowing air. After 2 hours of soaking, the furnace was heated to about 1150° C. with a temperature increase of 100° C./h and left for 5 hours before cooling to room temperature.

The fourth step was the impregnation of the first catalyst precursor layer to form oxygen reduction catalyst layer 12. The sintered cell was closed on one side by a rubber seal. A nitrate solution of La, Sr, Co and Fe was vacuum infiltrated into the porous structure. The infiltration was performed six times with an intermediate heating step for decomposition of the nitrates. The resulting composition of the impregnated oxygen reduction catalyst was: $(La_{0.6}Sr_{0.4})(Co_{0.2}Fe_{0.8})O_{3-\delta}$.

In the fifth step the second catalyst precursor layer was impregnated to form oxidation catalyst layer 13. The oxygen reduction catalyst impregnated side was protected by a rubber seal. A colloidal suspension of NiO and $(Sr_{0.6}La_{0.2})(Nb_{0.1}Ti_{0.9})O_{3-\delta}$ was vacuum infiltrated into the porous structure. The infiltration was performed five times with an intermediate drying between each infiltration. The volume ratio of NiO:SLNT was 1:10.

The obtained membrane was about 100 μm thick and. ready to be built into a stack of cells. No heat treatment prior to stacking was required.

Example 12

Manufacture of a ceria high temperature oxygen separation membrane with a configuration as illustrated in FIG. 1.

The membrane was obtained as described in Example 10, with the exception that a mixture of $(Ce_{0.9}Sm_{0.1})O_{2-\delta}$ (CSO10) and Fe22Cr powder in a 1:1 volume was used in layer 12 and CSO10+1 vol % $Mn_3O_4$ was used in layer 11.

The sintering procedure was performed as described in the following:

The laminate was heated at an increase of about 50° C./h to about 500° C. under flowing air. After 2 hours of soaking, the furnace was heated to about 900° C. under flowing air with a temperature increase of 100° C./h. The furnace was evacuated and $H_2$ introduced. After 2 hours soaking time, the furnace was heated to about 1200° C. with a temperature increase of 100° C./h and left for 5 hours before cooling to room temperature.

The cell was completed as described in Example 10.

Example 13

Manufacture of a ceria high temperature oxygen separation membrane with a configuration as illustrated in FIG. 1.

The first step comprised the co-casting of a three-layered structure (layer 12 and 13—catalyst precursor layers, and layer 12—membrane layer) with intermediate drying after tape-casting of each layer. Suspensions for tape-casting were manufactured by means of ball milling of powders with polyvinyl pyrrolidone (PVP), polyvinyl butyral (PVB) and EtOH+MEK as additives. After control of particle size, the suspensions were tape-cast using a double doctor blade set-up as described below and the cast was subsequently dried.

Catalyst precursor layer—layer 12 and 13: The suspension comprised pre-calcined $(Ce_{0.9}Gd_{0.1})O_{2-\delta}$ and 10 vol % charcoal as a pore-former. The green thickness was about 40 µm. The sintered porosity of the layer was about 50%.

Membrane layer—layer 11 The suspension was based on $(Ce_{0.9}Gd_{0.1})O_{2-\delta}$ and 0.2 vol % $Mn_3O_4+MgCrO_4$. The green thickness of the foil was about 12 µm. The sintered density of the layer was >96% of the theoretical density.

Layer 12 was tape-cast onto a polymeric foil. After drying, Layer 11 was tape-cast directly onto Layer 12, and after a subsequent drying layer 13 was tape-cast directly onto the two layered structure comprising Layer 12 and Layer 11.

In the second step, the co-cast tapes were cut into square pieces. This was done by knife punching resulting in sintered areas in the range of 200-600 cm².

The third step comprised sintering. The laminate was heated at an increase of about 50° C./h to about 500° C. under flowing air. After 2 hours of soaking, the furnace was heated to about 1250° C. with a temperature increase of 100° C./h and left for 5 hours before cooling to room temperature.

The fifth step was the impregnation of the second catalyst precursor layer to form oxygen reduction catalyst layer 13. The sintered cell was protected on one side. A nitrate solution of La, Sr and Co was vacuum infiltrated into the porous structure. The infiltration was performed six times with an intermediate heating step for decomposition of the nitrates. The resulting composition of the impregnated perovskite oxygen reduction catalyst was: $(La_{0.6}Sr_{0.4})CoO_{3-\delta}$.

In the sixth step the first catalyst precursor layer was impregnated to form oxidation catalyst layer 12. The oxygen reduction catalyst impregnated side was protected. A nitrate solution of Ni, Ce and Gd was vacuum infiltrated into the porous structure. The infiltration was performed five times with an intermediate heating schedule between each infiltration for decomposition of the impregnated nitrates. The resulting composition of the impregnated oxidation catalyst part was 50 vol % Ni and 50 vol % $(Ce_{0.9}Gd_{0.1})O_{2-\delta}$ (after reduction of NiO).

The obtained membrane was about 100 µm thick and ready to be built into a stack of cells. No heat treatment prior to stacking was required.

Example 14

Manufacture of a ceria high temperature oxygen separation membrane with a configuration as illustrated in FIG. 1.

The first step comprised co-casting of a three-layered structure (layer 12 and 13—catalyst precursor layer, and layer 11—membrane layer) without intermediate drying.

Suspensions for tape-casting were manufactured by means of ball milling of powders with polyvinyl pyrrolidone (PVP), polyvinyl butyral (PVB) and EtOH+MEK as additives. After control of particle size, the suspensions were tape-cast using a double doctor blade set-up as described below and the cast is subsequently dried.

Catalyst precursor layer—layer 12 and 13: The suspension comprised pre-calcined $(Ce_{0.9}Gd_{0.1})O_{2-\delta}$ and 10 vol % charcoal as a pore-former. The green thickness was about 40 µm. The sintered porosity of the layer was about 50% width.

Membrane layer—layer 11: The suspension was based on $(Ce_{0.9}Gd_{0.1})O_{2-\delta}$ $(+La_{0.8}Sr_{0.2}Cr_{0.8}V_{0.3}O_{3-\delta})$. The green thickness of the foil was about 12 µm. The sintered density of the layer was >96% of the theoretical density.

Three doctor blade set-ups were placed in series on a polymeric film and the three layers were tape-cast directly onto one another. Layer 12—Layer 11 and Layer 13.

In the second step, the co-cast tapes were cut into square pieces. This was done by knife punching resulting in sintered areas in the range of 200-600 cm².

The third step comprised sintering. The laminate was heated at an increase of about 50° C./h to about 500° C. under flowing air. After 2 hours of soaking, the furnace was heated to about 1150° C. with a temperature increase of 100° C./h and left for 5 hours before cooling to room temperature.

The fifth step was the impregnation of the second catalyst precursor layer to form oxygen reduction catalyst layer 13. The sintered cell was protected on one side. A nitrate solution of La, Sr and Co was vacuum infiltrated into the porous structure. The infiltration was performed six times with an intermediate heating step for decomposition of the nitrates. The resulting composition of the impregnated perovskite oxygen reduction catalyst was: LSC40.

In the sixth step the first catalyst precursor layer was impregnated to form oxidation catalyst layer 12. The oxygen reduction catalyst impregnated side was protected. A nitrate solution of Ni, Ce and Gd was vacuum infiltrated into the porous structure. The infiltration was performed five times with an intermediate heating schedule between each infiltration for decomposition of the impregnated nitrates. The resulting composition of the impregnated oxidation catalyst part was 50 vol % Ni and 50 vol % $(Ce_{0.9}Gd_{0.1})O_{2-\delta}$ (after reduction of NiO).

The obtained membrane was about 100 µm thick and ready to be built into a stack of cells. No heat treatment prior to stacking was required.

The invention claimed is:

1. A membrane comprising, in order, a first catalyst layer, an electronically and ionically conducting layer having a nanosized microstructure, and a second catalyst layer, wherein the electronically and ionically conducting layer is formed from an electrolyte material, a grain growth inhibitor and/or a grain boundary modifier,
   wherein the electronically and ionically conducting layer comprises $Ce_{1-x}M_xO_{2-\delta}$ (where M is selected from the group consisting of Ca, Sm, Gd, Sc, Ga and Y, and $0 \le x \le 1$);
   wherein the grain growth inhibitor comprises an oxide selected from the group consisting of $Sc_2O_3$, $VO_x$, $TaO_x$, $MnO_x$, $NbO_x$, SrO, CaO, MgO, $Bi_2O_3$, $LnO_x$, $MgCr_2O_4$, $MgTiO_3$, $CaAl_2O_4$, $LaAlO_3$, $YbCrO_3$, $ErCrO_4$, $NiTiO_3$, $NiCr_2O_4$, metal carbides, metal nitrides, and mixtures thereof; and
   wherein the grain boundary modifier comprises an oxide selected from the group consisting of $MnO_x$, $VO_x$, $MgCr_2O_4$, $CaCr_xV_yO_4$, $SrCr_xV_yO_4$, $YbCrO_3$, $ErCrO_4$, $NiTiO_3$, $NiCr_2O_4$, and mixtures thereof.

2. The membrane of claim 1, wherein the first catalyst layer and/or the second catalyst layer comprise a metal.

3. The membrane of claim 2, wherein the metal is selected from the group consisting of $Fe_{1-x-y}Cr_xM_y$ (where M is Ni, Ti, Ce, Mn, Mo, W, Co, La, Y or Al, $0 \leq x \leq 1$, $0 \leq y \leq 1$) and Ni-based alloys, and wherein $x+y \leq 1$.

4. The membrane of claim 1, wherein the first catalyst layer and/or the second catalyst layer comprise an oxide.

5. The membrane of claim 1, wherein the first and second catalyst layers comprise a catalyst material.

6. The membrane of claim 5, wherein at least one of the first and second catalyst layers comprises a catalyst material selected from the group consisting of $(Ma_{1-x}Mb_x)(Mc_{1-y}Md_y)O_{3-\delta}$, doped ceria or doped zirconia, and mixtures thereof; (where Ma=lanthanides or Y; Mb=earth alkali elements; Mc and Md are one or more elements chosen from the group of transition metals; $0 \leq x \leq 1$ and $0 \leq y \leq 1$).

7. The membrane of claim 5, wherein at least one of the first and second catalyst layers comprises a catalyst material selected from the group consisting of Ni, Ni—Fe alloy, Ru, Pt, doped ceria, doped zirconia, $Ma_sTi_{1-x}Mb_xO_{3-\delta}$ (where Ma=Ba, Sr, Ca; Mb=V, Nb, Ta, Mo, W, Th, U; $0 \leq s \leq 0.5$; $0 \leq x \leq 1$), $LnCr_{1-x}M_xO_{3-\delta}$ (where M=Ti, V, Mn, Nb, Mo, W, Th, U; $0 \leq x \leq 1$), and mixtures thereof.

8. The membrane of claim 1, further comprising a support layer for the first catalyst layer and/or the second catalyst layer.

9. A method of producing the membrane of claim 1, comprising the steps of:
   providing a first catalyst or catalyst precursor layer;
   applying an electronically and ionically conducting layer on the first catalyst or catalyst precursor layer;
   applying a second catalyst or catalyst precursor layer on the electronically and ionically conducting layer to provide a multilayer structure; and
   sintering the multilayer structure.

10. The method of claim 9, further comprising the step of applying a catalyst material or catalyst precursor material to the first and/or second catalyst or catalyst precursor layer.

11. The method of claim 9, further comprising the step of providing a support layer for the first and/or second catalyst or catalyst precursor layer.

12. The method of claim 9, wherein the sintering is carried out at temperatures of about 700 to 1500° C.

13. A method for separating oxygen from an oxygen-containing mixture, comprising contacting the membrane of claim 1 with the oxygen-containing mixture.

* * * * *